March 25, 1969  D. W. RABENHORST  3,434,255
SPACECRAFT EXTENDIBLE BOOM SUNSHADE
Filed Feb. 2, 1968  Sheet 1 of 3

DAVID W. RABENHORST
INVENTOR

BY J. O. Tresansky
ATTORNEY

March 25, 1969     D. W. RABENHORST     3,434,255
SPACECRAFT EXTENDIBLE BOOM SUNSHADE
Filed Feb. 2, 1968     Sheet 2 of 3
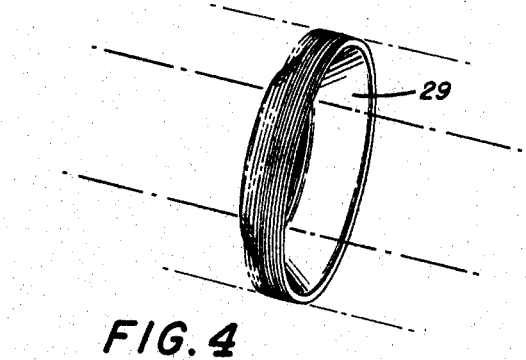
FIG. 4
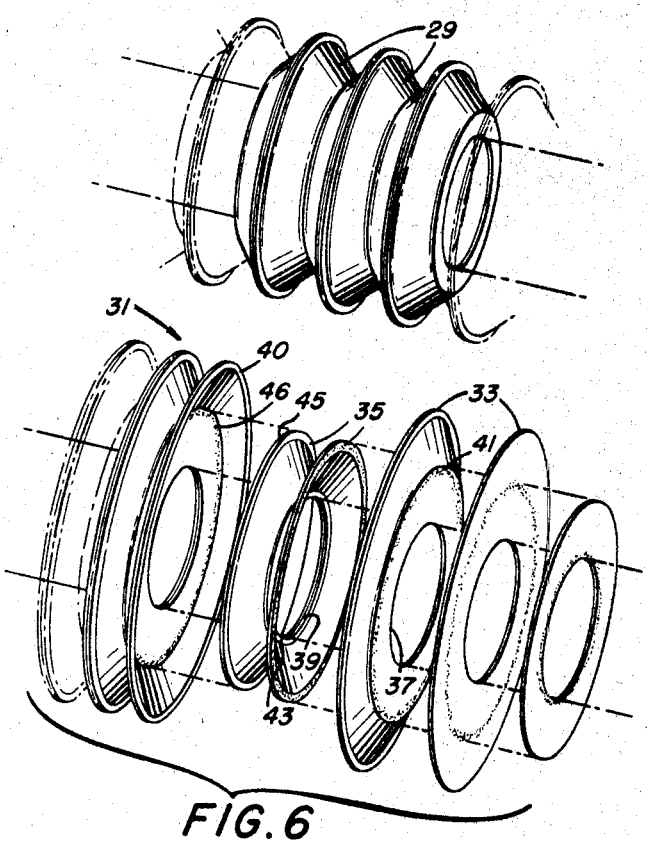
FIG. 5
FIG. 6
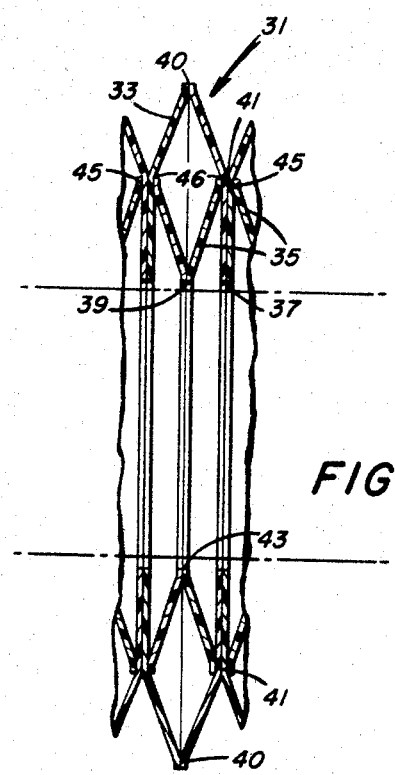
FIG. 7
DAVID W. RABENHORST
*INVENTOR*

March 25, 1969 D. W. RABENHORST 3,434,255
SPACECRAFT EXTENDIBLE BOOM SUNSHADE
Filed Feb. 2, 1968 Sheet 3 of 3
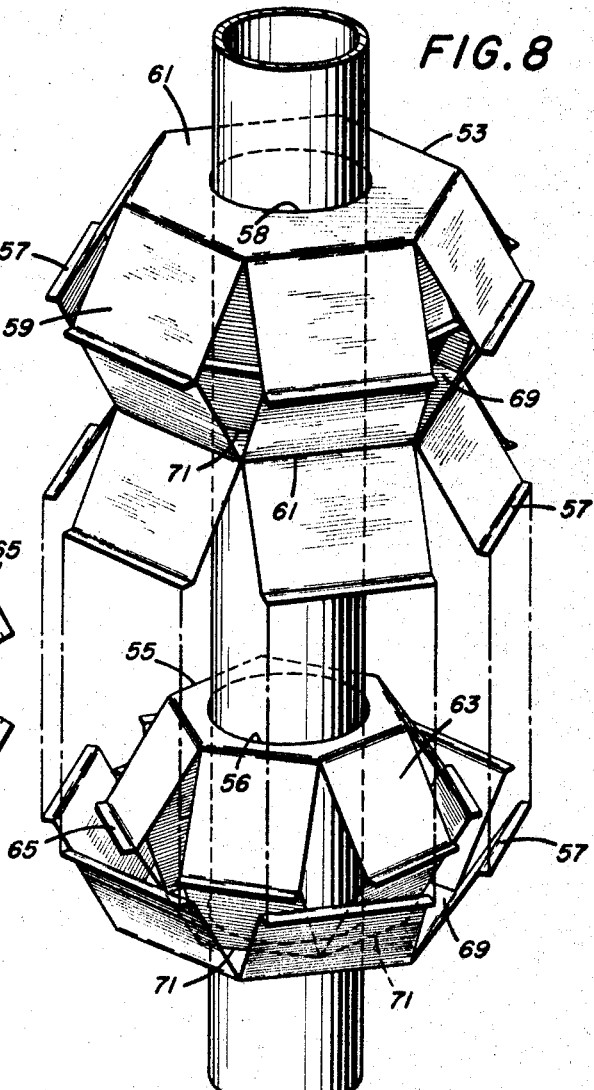
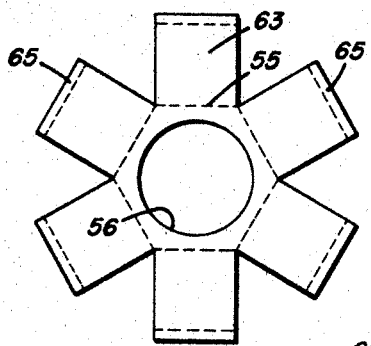
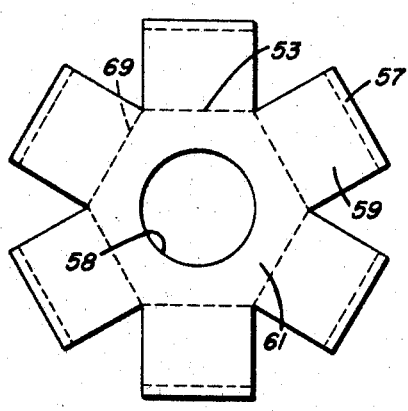
DAVID W. RABENHORST
INVENTOR

United States Patent Office 3,434,255
Patented Mar. 25, 1969

3,434,255
SPACECRAFT EXTENDIBLE BOOM SUNSHADE
David W. Rabenhorst, Silver Spring, Md., assignor to the United States of America as represented by the Secretary of the Navy
Filed Feb. 2, 1968, Ser. No. 702,689
Int. Cl. E04h *12/08;* B65h *75/00*
U.S. Cl. 52—108                    6 Claims

ABSTRACT OF THE DISCLOSURE

The subject invention relates to a sunshade developed in response to the problem of preventing thermal bending of booms extended from satellites into solar pressure zones. So far as is known, the device is the first sunshade which may be adapted for use with satellite booms and associated housings already in existance and approved for flight experiments. For example, the sunshade of the present invention may be stored in a collapsed position within a presently available boom housing and erected simultaneously with an existing boom in order to shade its entire extended length from solar radiation effects.

BACKGROUND OF THE INVENTION

Field of the invention

Extendible booms find varied application to satellites, such as with gravity-gradient passive-stabilization systems. A major problem encountered in the use of such booms is the thermal bending of the boom as the satellite moves in and out of sunlight, or as the aspect angle of the boom-to-sun-line changes. The subject invention materially decreases this thermal bending by shielding the boom structure from solar radiation.

Description of the prior art

The prior art does not, generally speaking, disclose a solar shade for an extendible boom. Reelable structural members suitable for satellite booms are disclosed by Peter Isaac in U.S. Patent 3,298,142 of Jan. 17, 1967 and 3,300,910 of Jan. 31, 1967, but no shielding means are included in said patents.

Thermal bending in extendible booms can be extreme, as much as 15 ft. of bending for 150 ft. of boom length. Appropriate surface treatment and boom fabrication techniques can reduce this bending by a factor of 3 or 4. Certain boom configurations should theoretically have zero thermal bending; however, none are known which demonstrate this theory without introducing new problems in other areas, such as deployment of the boom. The present device should demonstrate a tenfold thermal effect improvement over a bare boom.

SUMMARY OF THE INVENTION

The instant invention comprises an extendible boom sunshade which is compatible functionally and physically with currently available extendible satellite booms and their associated housings and erection mechanisms. The shade consists of a compact stack of disc-shaped plates provided with a central aperture and joined alternately at outer and inner margins to form an expandible bellows having an inner aperture for accommodating a tubular boom. One end of the stack is attached to the boom while the other end is attached to the boom housing. When the boom is extended in a well-known manner, the stack will expand and extend with it thereby shielding the boom from solar radiation. It is therefore an object of the invention to provide a means for shielding an extendible satellite boom in order to prevent bending due to thermal effects.

It is a further object of the invention to provide an inexpensive boom sunshade which may be automatically deployed and retracted without the use of equipment other than that used to deploy and retract the boom itself.

It is also an object of the invention to provide a compact, lightweight, and easily stored sunshade which permits deployment forces as low as a few thousandths of an ounce and which can easily be supported by the boom when extended.

DESCRIPTION OF THE DRAWINGS

FIG. 4 is a perspective view depicting the stacked, or deployed, configuration of a sunshade composed of conical elements.

FIG. 5 is a detail perspective view of a sunshade composed of conical elements, shown in a deployed configuration.

FIG. 6 is a partially exploded view of different size elements composing another embodiment of the invention.

FIG. 7 is an enlarged detail cross-section of the embodiment of the invention shown in FIG. 6.

FIG. 8 is a partially exploded view of a still further embodiment of the invention.

FIG. 9 is a top view of one element of the embodiment seen in FIG. 8.

FIG. 10 is a top view of another element of the embodiment seen in FIG. 8.

DESCRIPTION OF THE PREFERRED EMBODIMENTS

Figure 1:
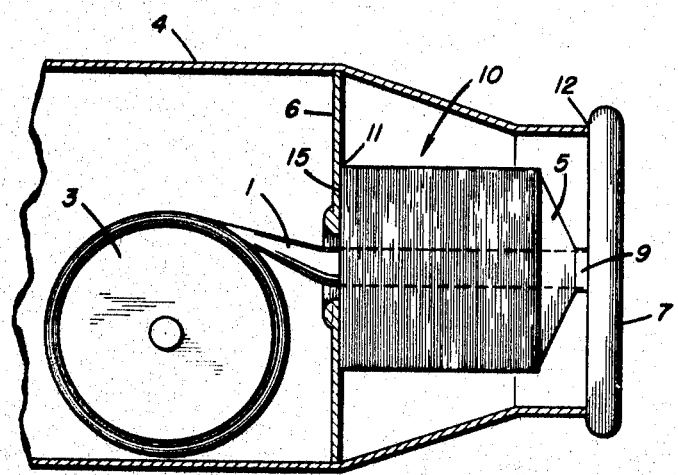
FIG. 1 is a longitudinal section of a typical extendible boom, boom erection unit, and extendible boom sunshade, seen in a non-deployed configuration.
Figure 2:
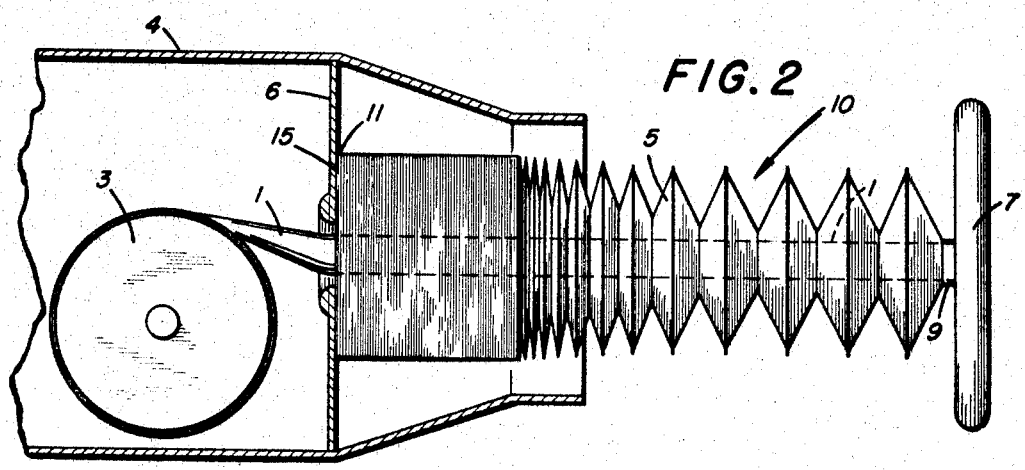
FIG. 2 is a view similar to FIG. 1 but showing the boom and the invention partially deployed.

Referring to the drawings and particularly to FIGS. 1 and 2, a typical extendible boom 1, boom erection unit 3, a housing 4 for said unit, and extendible boom sunshade 5 are shown in non-deployed and deployed situations. The boom erection unit 3 comprises well-known means for automatically deploying and retracting the extendible boom. The boom 1 and sunshade 5 are contained within housing 4 which provides a covering for the sunshade 5 when in the non-deployed configuration. The housing 4 also contains the boom erection unit 3 which is disposed within that portion of the housing located behind partition 6. An end mass 7 attached to the boom at its outer end 9 is contiguous to the housing at 12, closing off the interior of housing 4 when in the non-deployed configuration. When deployed, the end mass 7 may either serve as a weight to stabilize a spacecraft or contain instrumentation for experiments which must be carried out at some distance from the spacecraft. The boom sunshade 5 is composed of an arrangement of companion pairs of interconnected thin-film plates shown at 10 in a stacked, or non-deployed configuration in FIG. 1. FIG. 2 pictures the boom sunshade 5 in a partially extended configuration showing the bellows nature of the sunshade. A stationary end 11 of the arrangement of interconnected plates 10 is attached to the boom housing 4 at 15. The outermost plate at the other end of the arrangement of plates is connected to the boom at its outer end. On deployment of the boom 1 the arrangement of interconnected plates 10 comprising the boom sunshade 5 automatically unfolds in bellows fashion.

Figure 3:
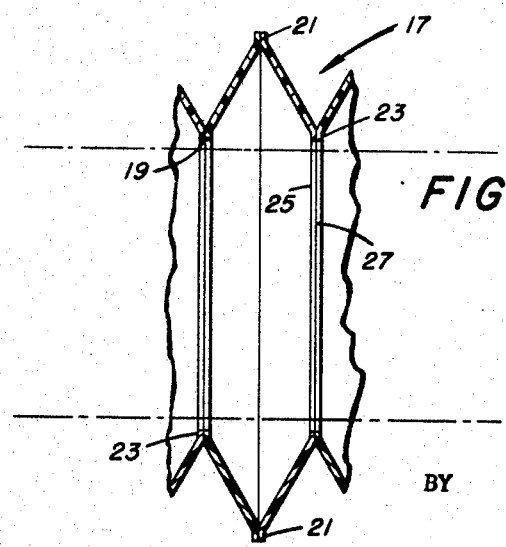
FIG. 3 is an enlarged detail cross-section of one embodiment of an extendible boom sunshade.

In FIG. 3, discs 17 are seen to be joined to form an arrangement of interconnected plates. A single disc 17 is a flat, circular piece of very thin material provided with a central aperture 19 which has a diameter slightly larger than the outer diameter of the spacecraft extendible boom which is to be shielded and allows the boom to pass through said central aperture. A multiplicity of such discs 17 are interconnected alternately at their outer and inner margins 21 and 23, respectively. To describe further such an arrangement of interconnected plates, each disc 17, having first and second faces 25 and 27, is positioned in proximity to two other like discs with their central apertures 19 aligned. The outer margin 21 on the first face 25 of a first disc is joined to the outer margin 21 of a second disc opposite that face. The inner margin 23 on the second face of the first disc is joined to the inner margin of a third disc opposite the second face 27. Thus joined, this arrangement of interconnected discs may be easily expanded and contracted with the movements of the shielded boom. Similarly, conical elements 29 may be substituted for discs 17. FIG. 4 pictures a stacked, or non-deployed arrangement, while FIG. 5 shows interconnected conical elements 29 in a deployed configuration.

As shown in FIG. 6 the boom sunshade may take the form of a layered arrangement of concentric thin-film plates as shown at 31. In the particular arrangement shown, discs of two different diameters comprise the sunshade, although arrangements utilizing discs of three or more different diameters may be similarly constructed. In the arrangement 31, said plates are discs of relatively large diameter 33 and of relatively small diameter 35 in concentric arrangement. The relatively large disc 33 is provided with a central aperture 37 of slightly smaller diameter than the outer diameter of the relatively small disc 35, said disc 35 being provided with a central aperture 39 of a diameter slightly larger than the outer diameter of an extendible boom to be shielded. The discs are arranged with two relatively small discs 35 positioned between each pair of large discs 33. The large discs 33 are joined alternately along outer and inner margins 40 and 41. The small discs 35 are alternately joined together at inner margins 43 and are joined to large discs 33 along outer margins 45 at 46, an outer margin 45 of the small disc 35 being contiguous to the inner margin 41 of the large discs 33, forming a "bellows within a bellows" configuration, as shown in section in FIG. 7.

As shown in FIG. 9 and FIG. 10, thin-film plates having a wide-spoke shape comprise regular polygons 53 and 55 of different diameter, e.g., hexagons in the cases shown, with each side of the hexagons having integral rectangular flaps 59 and 63. An assembled sunshade according to this embodiment of the invention comprises wide-spoke hexagons of two different diameters and is seen in FIG. 8, the relatively larger hexagon 53, which is shown in FIG. 10, and a relatively smaller hexagon 55, seen in FIG. 9, the smaller and larger hexagons each being provided with uniform size central apertures 56 and 58 respectively. The wide-spoke hexagons are arranged in opposed companion pairs with two relatively small hexagons 55, also arranged in opposed companion pairs, positioned within each pair of relatively large hexagons 53. Pairs of the large hexagons 53 are joined by connecting the outer edges 57 of the flaps 59 and connecting adjacent meeting faces 61. The small hexagons 55 are angularly offset relative to the large hexagons 53. Companion pairs of smaller hexagons 55 are connected along edges 65 in the manner described for the larger hexagon pairs and are also joined generally at 71 to inner faces 69 of said large hexagons 53.

A further embodiment of the present invention contemplates that the central apertures be of such diameter as to cause a snug fit on an extendible boom, as shown in FIG. 3, whereby a slightly greater force is necessary to slide the interconnected discs, or bellows, on said boom than is necessary to extend a single pair of the interconnected discs. Thus, one the sunshade is deployed, the only force on the boom is that between stages of the interconnected discs; and, in fact, if said discs were separated in several places, the individual stages would be held in place by the slightly greater friction load on the boom than that force necessary to maintain the deployed configuration of the discs.

It is believed apparent that the present device is not confined to the specific use or uses described herein since it can be used for such purposes for which it may be suited. The invention is not to be limited to the particular construction described in these embodiments, it being considered that minor changes in construction, such as the coating with a thermal control material of said thin-film materials used to construct the sunshade, are contemplated.

What is claimed is:

1. In combination with an extendible boom and a housing therefor,
   a sunshade comprising a plurailty of pairs of opposed plates having apertures receiving the boom therethrough,
   said pairs of plates being connected to form a bellows,
   the outermost plate of the outermost pair of plates being connected to the outer end of the boom and the innermost plate of the innermost pair of plates being secured to the housing,
   said pairs of plates being received in said housing in collapsed condition when the boom is retracted,
   and means in the housing and operable for extending the boom and withdrawing the sunshade from the housing in bellows fashion.

2. The sunshade for spacecraft extendible booms of claim 1 wherein said plates are discs provided with central apertures and joined alternately along outer and inner margins to form an expandible bellows, said central apertures each being of diameter large enough to accommodate a tubular boom.

3. The sunshade for spacecraft extendible booms of claim 1 wherein said plates are conical in shape, are each provided with a central aperture, and are joined alternately along their outer and inner margins.

4. The sunshade of spacecraft extendible booms of claim 1 and further comprising a layered arrangement of concentric plates wherein said plates are opposed discs of two different diameters arranged with two discs of relatively small diameter positioned between each pair of discs of relatively large diameter, the relatively large discs being joined alternately along outer and inner margins while the relatively small discs are likewise alternately joined along inner margins and the outer margins of the relatively small discs are joined to the faces of the relatively large discs, producing a bellows-within-a-bellows configuration.

5. The sunshade for spacecraft extendible booms of claim 4 wherein said concentric plates take the form of regular polygons of two different diameters with each side of each polygon having an integral rectangular flap, pairs of relatively small polygons being positioned between pairs of relatively large polygons, the relatively large polygons being joined alternately along their adjacent meeting faces while each pair of the relatively small polygons are joined together along the outer edges of their rectangular flaps and also joined to the faces of the relatively large polygons, layers of such plates being angularly offset relative to each other.

6. A sunshade for a spacecraft extendible boom according to claim 1 wherein the plates are constructed of a thin-film material and are covered with a thermal control material such as a vacuum-deposited aluminum coating.

(References on following page)

References Cited

UNITED STATES PATENTS

| | | | |
|---|---|---|---|
| 2,269,363 | 1/1942 | Farrand | 52—108 |
| 2,327,163 | 8/1943 | Barrett | 242—54 |
| 2,969,211 | 1/1961 | Von Saurma | 244—1 |
| 3,277,614 | 10/1966 | Marie | 52—2 |
| 3,300,910 | 1/1967 | Isaac | 52—108 |

FOREIGN PATENTS

| | | |
|---|---|---|
| 1,382,305 | 11/1964 | France. |
| 547,836 | 3/1932 | Germany. |

HENRY C. SUTHERLAND, *Primary Examiner.*

U.S. Cl. X.R.

242—54